US011762549B1

United States Patent
Baraka et al.

(10) Patent No.: US 11,762,549 B1
(45) Date of Patent: Sep. 19, 2023

(54) CONTENT CAROUSEL WITH DYNAMICALLY POSITIONED BUBBLES

(71) Applicant: Intuit Inc., Mountain View, CA (US)

(72) Inventors: David Baraka, Oakland, CA (US); Samuel Austin Smith, Trophy Club, TX (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/983,988

(22) Filed: Nov. 9, 2022

(51) Int. Cl.
*G06F 3/0488* (2022.01)
*G06F 3/04817* (2022.01)

(52) U.S. Cl.
CPC ........ *G06F 3/0488* (2013.01); *G06F 3/04817* (2013.01)

(58) Field of Classification Search
CPC .................................................. G06F 3/0488
See application file for complete search history.

(56) References Cited

U.S. PATENT DOCUMENTS

2006/0048076 A1\* 3/2006 Vronay ................. G06F 3/0482
715/850
2007/0180408 A1\* 8/2007 Rusu ..................... G06F 16/957
707/E17.119
2015/0378563 A1\* 12/2015 Ramanathan ....... G06F 3/04842
715/781

OTHER PUBLICATIONS

Dharminder Dhanda. (Apr. 29, 2016). Bubble Chart [Blog post]. Retrieved from Internet on Jul. 6, 2022 at URL: http://dharminder.dhanda.com.au/blog/charts/bubble-chart-2/.
Elementus. "This is What 4 Years of ICO Activity Looks Like." YouTube, Dec. 12, 2017, retrieved from Internet on Jul. 6, 2022 at URL: https://www.youtube.com/watch?v=ac1P3GXkFxc.

\* cited by examiner

*Primary Examiner* — Roland J Casillas
(74) *Attorney, Agent, or Firm* — Paradice & Li LLP

(57) ABSTRACT

Systems and methods for dynamic presentation of content items in a user interface are disclosed. An example method includes presenting a plurality of content items on the user interface in a predetermined geometric arrangement, receiving a user selection of a first content item of the plurality of content items, in response to receiving the user selection of the first content item, expanding the first content item while moving the first content item to a predetermined focus position within the geometric arrangement, and presenting, in the expanded first content item, additional information associated with the first content item, where the additional information is not displayed before receiving the user selection of the first content item.

18 Claims, 13 Drawing Sheets

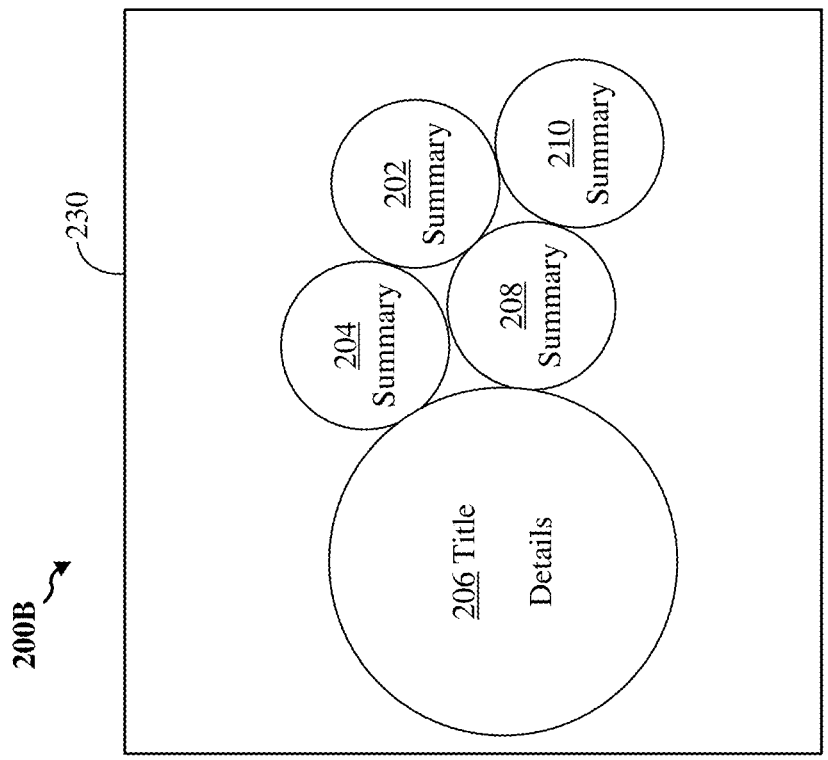
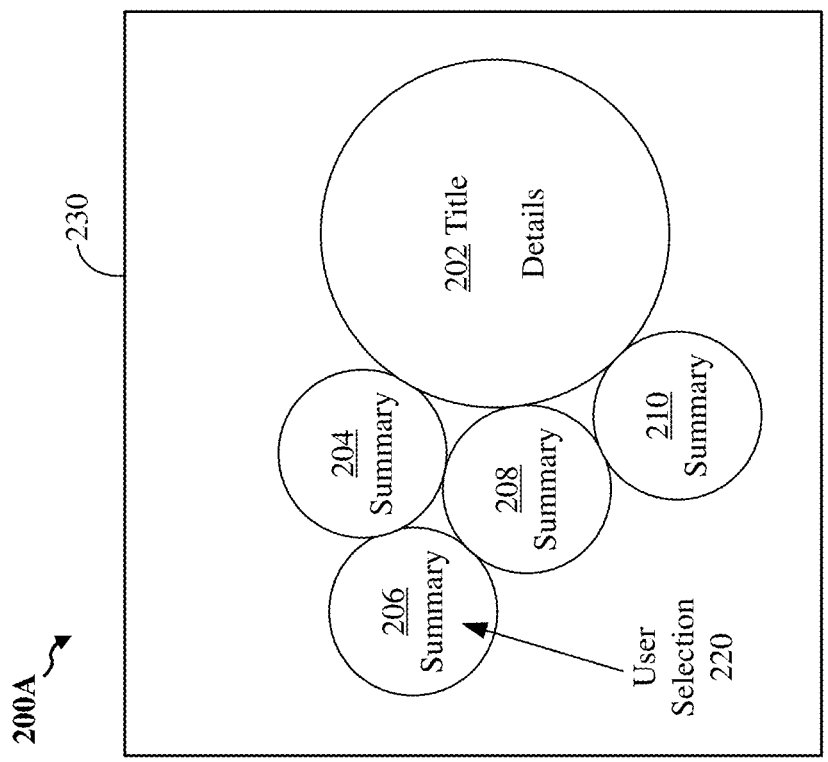

CONTENT CAROUSEL WITH DYNAMICALLY POSITIONED BUBBLES

TECHNICAL FIELD

This disclosure relates generally to user interfaces, and more particularly to improving the utility, flexibility, and compatibility of visualizations of multiple items of content in a user interface.

DESCRIPTION OF RELATED ART

Providers of digital information often desire to present this information to users in a dynamic, engaging, and yet easy to understand manner. This may be complicated by the wide variety of digital displays upon which such information may be presented. For example, mobile electronic devices, such as cellular phones, tablets, and so on, may have a variety of sizes, aspect ratios, and resolutions. As such, companies providing such presentations of content items desire to do so in a manner which is dynamic, interactive, and compatible with this wide variety of displays.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for dynamic presentation of content items in a user interface. An example method includes presenting a plurality of content items on the user interface in a predetermined geometric arrangement, receiving a user selection of a first content item of the plurality of content items, in response to receiving the user selection of the first content item, expanding the first content item while moving the first content item to a predetermined focus position within the geometric arrangement, and presenting, in the expanded first content item, additional information associated with the first content item, where the additional information is not displayed before receiving the user selection of the first content item.

In some aspects, presenting the plurality of content items includes presenting the plurality of content items in a predetermined order in the predetermined geometric arrangement.

In some aspects, the method further includes determining an available width of the user interface, where presenting the plurality of content items is based at least in part on the available width of the user interface. In some aspects, the geometric arrangement has a width determined based at least in part on the available width of the user interface.

In some aspects, presenting the plurality of content items further includes determining a dynamic position for each content item in the plurality of content items. In some aspects, the dynamic position for each content item is determined so that the plurality of content items are evenly spaced within the predetermined geometric arrangement. In some aspects, the dynamic position for each content item in the plurality of content items is determined based at least in part on a number of content items in the plurality of content items.

In some aspects, the predetermined geometric arrangement is a ring. In some aspects, the predetermined geometric arrangement is a closed polygon. In some aspects, the predetermined focus position is a center position of the predetermined geometric arrangement.

In some aspects, presenting the plurality of content items includes presenting, within each content item of the plurality of content items, summary information associated with the respective content item.

In some aspects, the method further includes prior to receiving the user selection of the first content item, presenting an initial content item at the predetermined focus position, wherein presenting the initial content item includes presenting additional information associated with the initial content item, and in response to receiving the user selection of the first content item, reducing a size of the initial content item while moving the initial content item into the predetermined geometric arrangement at a predetermined relative location within the plurality of content items. In some aspects, reducing the display size of the initial content item includes ceasing to display the additional content associated with the initial content item. In some aspects, moving the initial content item into the predetermined geometric arrangement includes dynamically adjusting a position of one or more remaining content items of the plurality of content items to maintain even spacing of the plurality of content items within the predetermined geometric arrangement.

Another innovative aspect of the subject matter described in this disclosure can be implemented as a system for dynamic presentation of content items in a user interface. An example system includes one or more processors, and a memory storing instructions for execution by the one or more processors. Execution of the instructions by the one or more processors causes the system to perform operations including presenting a plurality of content items on the user interface in a predetermined geometric arrangement, receiving a user selection of a first content item of the plurality of content items, in response to receiving the user selection of the first content item, expanding the first content item while moving the first content item to a predetermined focus position within the geometric arrangement, and presenting, in the expanded first content item, additional information associated with the first content item, where the additional information is not displayed before receiving the user selection of the first content item.

Another innovative aspect of the subject matter described in this disclosure can be implemented as a mobile communication device configured for dynamic presentation of content items. An example mobile communication device includes a touch-sensitive display, one or more processors, and a memory storing instructions for execution by the one or more processors. Execution of the instructions causes the mobile communication device to perform operations including presenting a plurality of content items in a predetermined geometric arrangement on the touch-sensitive display, receiving a touch gesture on the touch-sensitive display selecting a first content item of the plurality of content items, in response to receiving the touch gesture of the first content item, expanding the first content item while moving the first content item to a predetermined focus position within the geometric arrangement, and presenting, in the expanded first content item, additional information associated with the first content item, where the additional information is not displayed before receiving the touch gesture selecting the first content item.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2A shows a first view of a plurality of selectable content items, in accordance with some conventional techniques.

FIG. 2B shows a second view of the plurality of selectable content items of FIG. 1A.

Like numbers reference like elements throughout the drawings and specification.

DETAILED DESCRIPTION

Figure 1B:
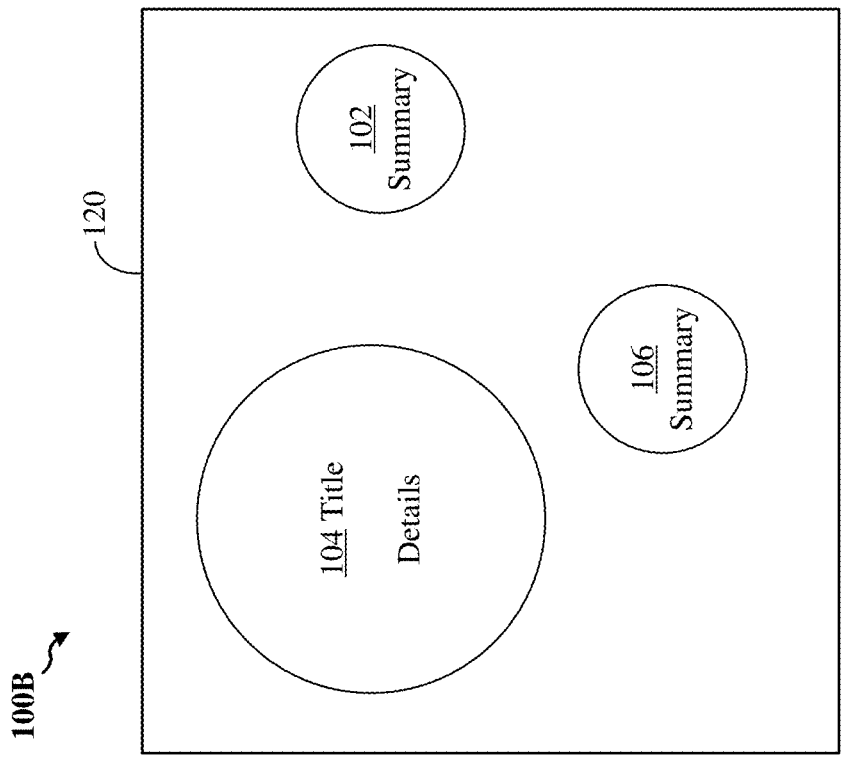
FIG. 1B shows a second view of the three content items depicted in FIG. 1A, in accordance with some conventional techniques.

Users increasingly use computing devices, particularly mobile computing devices, for reviewing information in a broad variety of contexts. A variety of advertisers, companies, financial institutions, employers, nonprofit organizations, and so on may provide such information for user review in the form of content visualizations. For example, a nonprofit organization may desire to provide users with interactive information about various societal problems and the organization's plans for addressing them, or a company may desire to provide an interactive display of their employees and their qualifications to potential customers, and so on. It may be desirable for such content to be provided in a structured and interactive manner. For example, structure may improve a user's understanding of the provided information, while interactivity may aid the maintenance of user attention. For example, structure may allow a user to view only a portion of the information at one time, such as separating information into discrete content items, and interactivity may allow a user to select which portion or portions of the information are displayed at one time, such as which of the one or more content items are displayed in full detail. However, because users may view such information on a variety of devices, having a variety of differing sizes, the specific manner in which the content visualization is displayed, such as a variety of sizes, widths, etc. associated with the display, may vary significantly.

Implementations of the subject matter described in this disclosure may be used to provide dynamic visualizations of content items on a user interface to display information to users. More particularly, the content items may be displayed in an organized manner in a geometric arrangement which is customized to the available space in the user interface. The content items may each be selectable, such content items may initially be displayed in a reduced size and in a specified order within the geometric arrangement, and when selected may be enlarged as the content item is moved to a focus position within the geometric arrangement. Remaining content items may be automatically animated to retain even spacing within the geometric arrangement while the selected content item is moved to the focus position. When the content item is displayed in the reduced size, it may display a first portion or information, such as an image or a summary relating to the content item, while when that same content item is enlarged and in the focus position, it may display a second, greater, portion of information, such as more detailed images or information relating to the content item. Subsequently, another content item may be selected, and be enlarged and moved to the focus position, while the initially selected content item is reduced in size and returned to its predetermined order within the geometric arrangement. During such subsequent selections and animations, the content items not in the focus position may be animated to maintain even spacing and the predetermined order. The geometric arrangement may be a ring or a closed polygon, such as a triangle, rectangle, or similar. These and other aspects of the example implementations are discussed in more detail below.

Figure 1A:
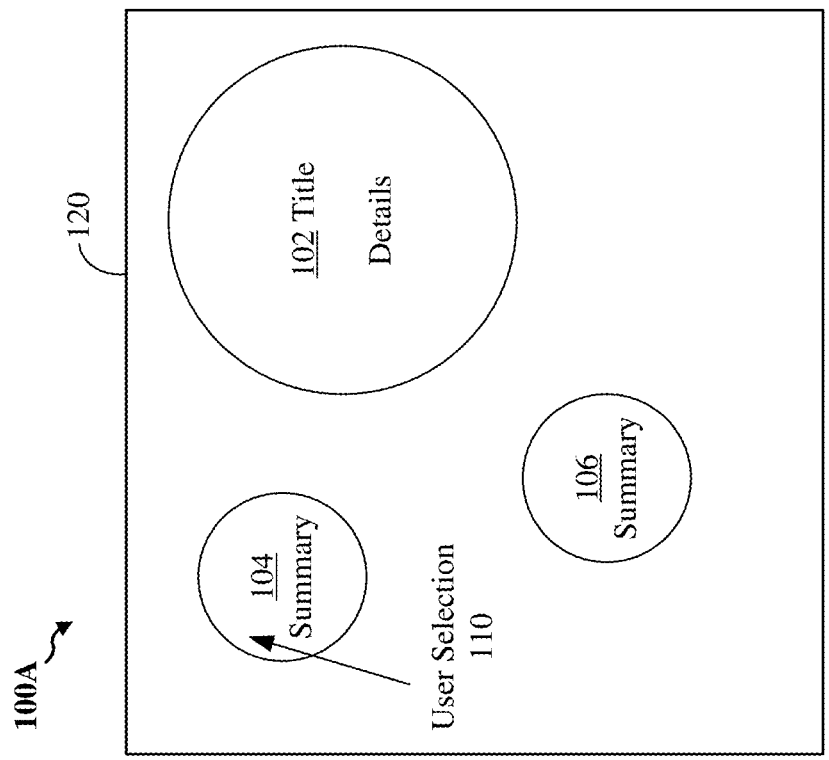
FIG. 1A shows a first view of three content items displayed on a user interface 120, in accordance with some conventional techniques.

Some conventional user interfaces may display selectable content items which may be enlarged upon selection to display additional information. For example, FIG. 1A shows a first view 100A of three content items displayed on a user interface 120, in accordance with some conventional techniques. A first content item 102 may be displayed in a selected state which is enlarged as compared to content items 104 and 106, which are displayed in an unselected state, which is smaller. Further, the content items in the unselected state, such as content item 104, may only display limited information, such as a summary or a limited amount of text or graphical information relating to that content item. In contrast, a content item in its selected state may display additional or more detailed information than that content item in its unselected state. Each of the content items may be selectable, at least in its unselected state. For example, a user selection 110 may select the content item 104. The user selection may be a mouse click, a tap or other touch gesture on a touch-sensitive display or similar. FIG. 1B shows a second view 100B of the three content items depicted in FIG. 1A, in accordance with some conventional techniques. More particularly, FIG. 1B shows the three content items after the user selection 110 has been received on content item 104. The content item 104 is expanded into its selected state, to display additional information such as graphics, a title, details, etc., while the previously selected content item 102 has returned to its unselected state, displaying only the limited information rather than the additional information displayed in its selected state. Note that the positions of the content items on the user interface 120 are unchanged from FIG. 1A to FIG. 1B, and that the relative locations of the three content items also unchanged.

Other conventional user interface tools may allow for content items to switch from an unselected state to a selected state while enabling some dynamic motion of the unselected content items. For example FIG. 2A shows a first view 200A of a plurality of selectable content items, in accordance with some conventional techniques. More particularly, FIG. 2A shows a plurality of five content items on a user interface 230, a first content item 202 in its selected state, and four content items 204, 206, 208, and 210, in their unselected states. While FIGS. 1A-1B depict separate and unconnected content items, the content items of FIG. 2A are each connected to one or more other content items, thus making up a cluster of bubbles. While the positions of the content items of FIGS. 1A-1B, and more particularly the positions of the unselected content items, remain unchanged, the unselected content items of FIG. 2A may move during selection in order to maintain their connectedness. However, the relative positions of the content items on the user interface 230, and their connectedness may remain unchanged. For example, a user selection 220 may be received on content item 206, triggering content item 206 to enter the selected state, enlarging, and displaying additional information. FIG. 2B shows a second view 200B of the plurality of selectable content items of FIG. 1A. The content item 206 is in its selected state, while the content item 202 has reverted to its unselected state. In some conventional techniques, a previously selected content item may revert to the unselected state, while in some other conventional techniques, the previously selected content item may remain in its selected state. Again, note that the relative positions of the content items remains unchanged on the user interface 230, and the connectivity of the content items remains unchanged between FIGS. 2A and 2B. For example, content item 206 remains connected to content items 204 and 208, and content item 208 remains connected to content items 202, 204, 206, and 210.

Various implementations of the subject matter disclosed herein provide one or more technical solutions to the technical problem of dynamically providing graphical information to users which is scaled to fit an available space within a user interface. In contrast to the conventional user interfaces described above, the example implementations provide dynamic content visualizations which scale to the size of the available user interface, and automatically adjust spacing of the content items to maintain a predictable and evenly spaced display. More particularly, a number of content items may be presented on a user interface in a geometric arrangement such as a ring or a closed polygon. Each content item may be selectable, and upon selection may be expanded and moved to a focus position within the geometric arrangement, while the positions of the remaining content items may be dynamically adjusted to maintain their even spacing and a predetermined order within the geometric arrangement. More specifically, various aspects of the present disclosure provide a unique computing solution to a unique computing problem that did not exist prior to the development of customizable user interfaces capable of presenting and dynamic visualizations. As such, implementations of the subject matter disclosed herein are not an abstract idea such as organizing human activity or a mental process that can be performed in the human mind.

Moreover, various aspects of the present disclosure effect an improvement in the technical field of dynamic content visualizations. The ability to generate such visualizations to fit an available width or size of a user interface may enable the visualizations to be presented usefully on a variety of screen sizes and devices. Further, the automatic rearrangement of non-selected content items may enable users to interact with the content items more easily on a variety of devices and screen sizes. Providing content visualizations which may automatically be generated to fill an available screen size, and which dynamically adjust spacing of the content items in response to user selection and reselection of such content items cannot be performed in the human mind, much less using pen and paper.

Figure 3A:
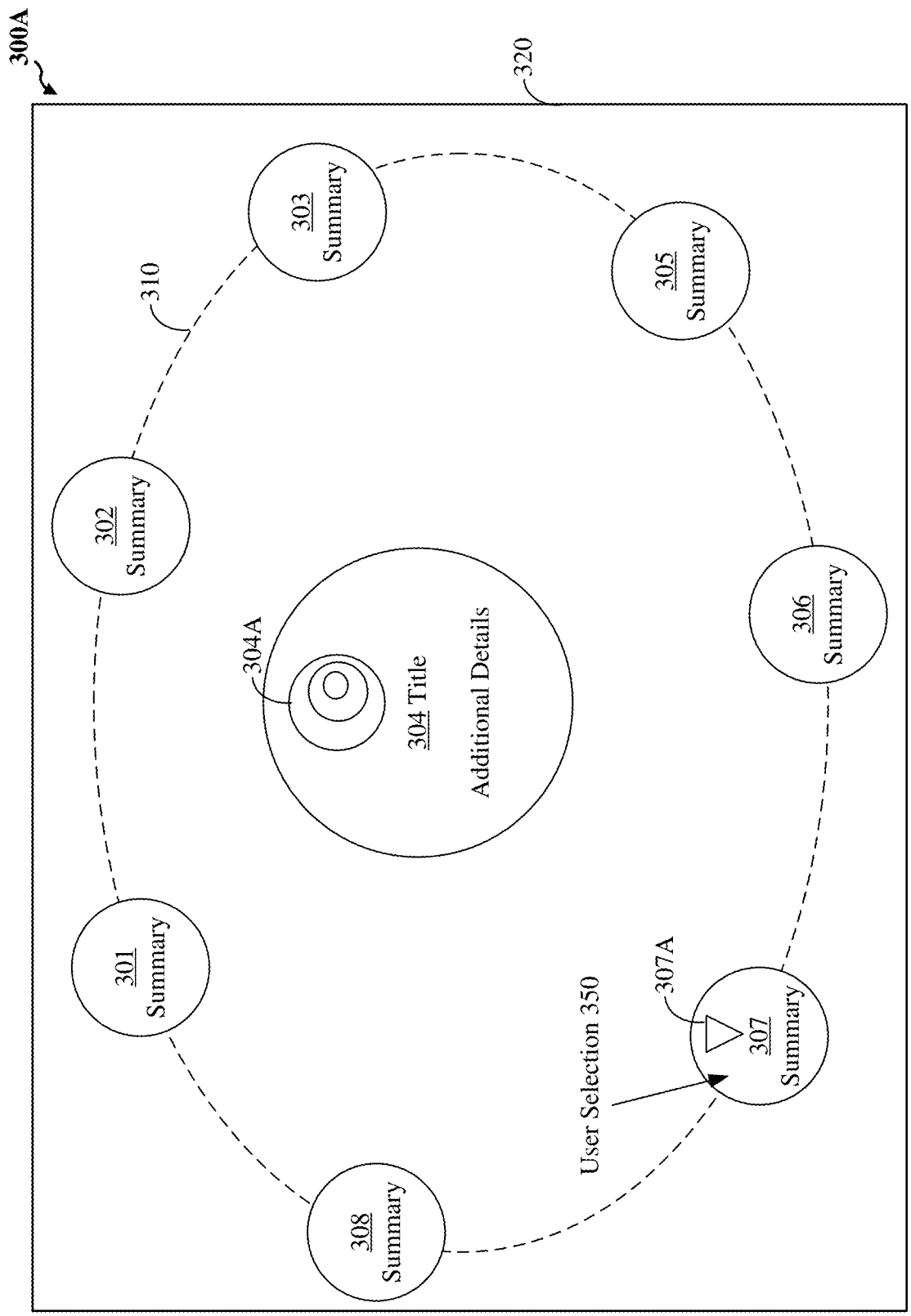
FIG. 3A shows an example content visualization, in accordance with some implementations.

FIG. 3A shows an example content visualization 300A, in accordance with some implementations. The content visualization 300A may include a plurality of content items 302, 303, 304, 305, 306, 307, and 308, arranged in a ring 310, displayed on a user interface 320. Note that while the content items are depicted in FIG. 3A as being round, that in other aspects the content items may have any suitable shape, such as a rectangular shape, a polygonal shape, or similar. In some aspects, the content items may have a predetermined order within the ring 310. For example, with respect to FIG. 3A, the content items are presented in increasing order from 301 to 308 within the ring 310, beginning at roughly the eleven o'clock position in the upper left with content item 301.

The ring 310 is but one example of the geometric arrangements in which the content items may be organized. Other examples may be a triangle, rectangle, another closed polygon, or similar. The ring 310, or other geometric arrangement, may have a size which is automatically determined based on the size of the user interface 320 on which the content visualization 300A is displayed. For example, on a narrower display, the user interface 320 may be narrower, and the ring 310 may be generated to have a narrower width than when the content visualization is displayed on a larger or wider display. Similarly, the spacing of the content items in the ring 310 may be determined based on the size of the user interface 302. For example, on smaller or narrower displays, the user interface 320 may be narrower and the content items may more closely spaced within the ring 310. Additionally, the spacing of the content items within the ring 310 depends on the number of content items in the plurality of content items. The spacing may be automatically determined such that the content items are evenly spaced around the ring 310, which may provide a clear and structured display of the content items to users on the user interface 320.

Each content item of the plurality of content items may be displayed in either an unselected state or a selected state, and so a content item may be described as "unselected" or "selected." Unselected content items may remain in the ring 310 in a comparatively small size and displaying only a comparatively small amount of text or graphical information. For example, in the unselected state a content item may display a summary of the information associated with the content item, and optionally one or more graphic items associated with the content item. The content items 302-303 and 305-308 are displayed in FIG. 3A in their unselected states. In contrast to unselected content items, selected content items may be comparatively larger, and may display additional information as compared to the small amount of information displayed in unselected content items. Additionally, any graphic items displayed in an unselected content item may also be enlarged. Optionally or in addition, one or more additional graphic items may be displayed in a selected content item, which are not displayed when that content item is unselected. The content item 304 is displayed in the selected state in FIG. 3A. Note how the content item 304 displays additional information rather than the summary displayed in unselected content item 307. Similarly, the graphic 304A displayed in the selected content item 304 is larger than the graphic 307A displayed in the unselected content item 307. The other unselected content items may also have their own graphic items, but they are not displayed in FIG. 3A for simplicity.

Note that while in FIG. 3A the selected content items and the unselected content items have the same shape, that in some implementations unselected content items may have a different shape from selected content items. For example, an unselected content item may have a circular shape, while the selected content items may have a larger oval, rectangular, or other shape different from the unselected content items.

In the content visualization 300A, a content item in its selected state is displayed in a focus position of the ring 310. The focus position of the ring 310 is in the center of the ring 310. Alternatively, the focus position may be in a location outside of the ring 310, such as above, below, or to the side of the ring 310. When the geometric arrangement is not a ring, but instead a closed polygon or similar, the focus position may be similarly located, in the center, above, below, or to the size of the geometric arrangement. Each of the unselected content items may be selectable, such as being selectable by a mouse click, a touch gesture, a keyboard click, a controller button click, or similar. For example, FIG. 3A shows a user selection 350 being performed on the unselected content item 307. The user selection 350 may trigger the content item 307 to enter its selected state, as discussed in more detail below with respect to FIGS. 3B and 3C.

Figure 3B:
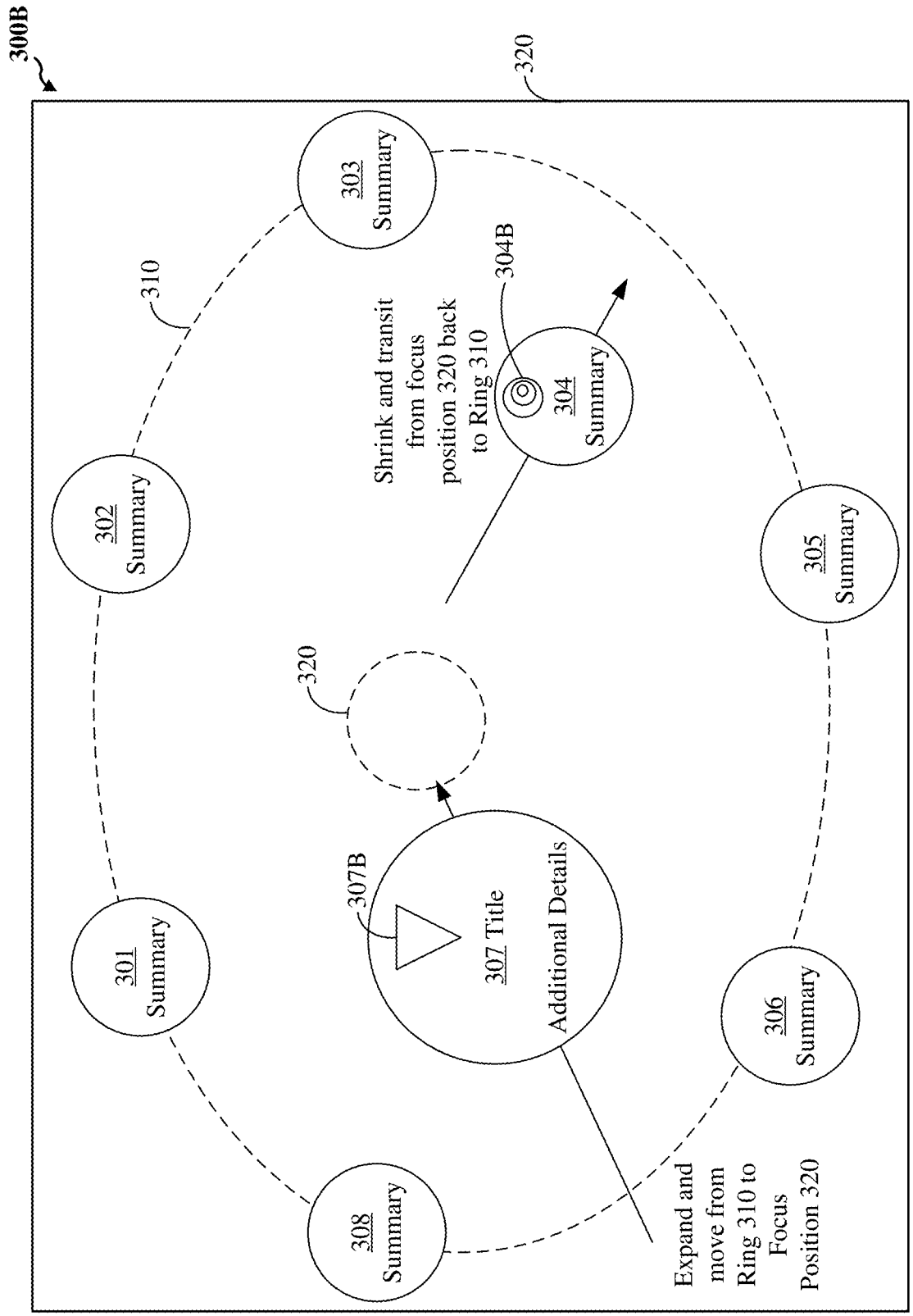
FIG. 3B shows an example content visualization, in accordance with some implementations.

FIG. 3B shows an example content visualization 300B, in accordance with some implementations. More particularly, FIG. 3B shows the content visualization of FIG. 3A after the user selection 350 has been received, and during the content item 307's transition from the unselected state to the selected state. In response to receiving the user selection 350, the content item 307 expands into its selected state while moving to the focus position 320, while the previously selected content item 304 reduces in size to its unselected state while moving from the focus position to the ring 310. More particularly, note that the predetermined order of the content items may be maintained during such this transition, and so the content item 304 moves into a position in the ring 310 between unselected content items 303 and 305. In addition, during the transition of the content item 307 to the focus position and the transition of the previously selected content item 304 back into the ring 310, the other content items (301-303, 305-306, and 308) may automatically move around the ring in order to maintain an even spacing in the predetermined order. And so, for example see content item 306, which was in roughly the 6 o'clock position at the bottom of the ring in FIG. 3A but has moved to roughly the 7 o'clock position in FIG. 3B. Note that the motion of the unselected content items is not complete but is shown in progress in FIG. 3B.

Further, note that the content item 307 is shown to include the additional information associated with its selected state in FIG. 3B, in addition to the graphic item 307B, which is enlarged during the transition of content item to its selected state. In some aspects, during the transition of a content item between the unselected state and the selected state, the additional information may not be displayed until the content item has reached the focus position. In some aspects, some or all of the information shown in the content item may not be displayed during transition between the unselected and selected states, or between the selected and unselected states. For example, in some implementations only a graphic item may be displayed during such transitions. For such examples, only the graphic item 307B may be displayed while the content item 307 moves from the ring 310 to the focus position 320. Similarly, for such examples, only the graphic item 304B may be displayed within the content item 304 while it moves from the focus position 320 to its position in the ring 310.

Figure 3C:
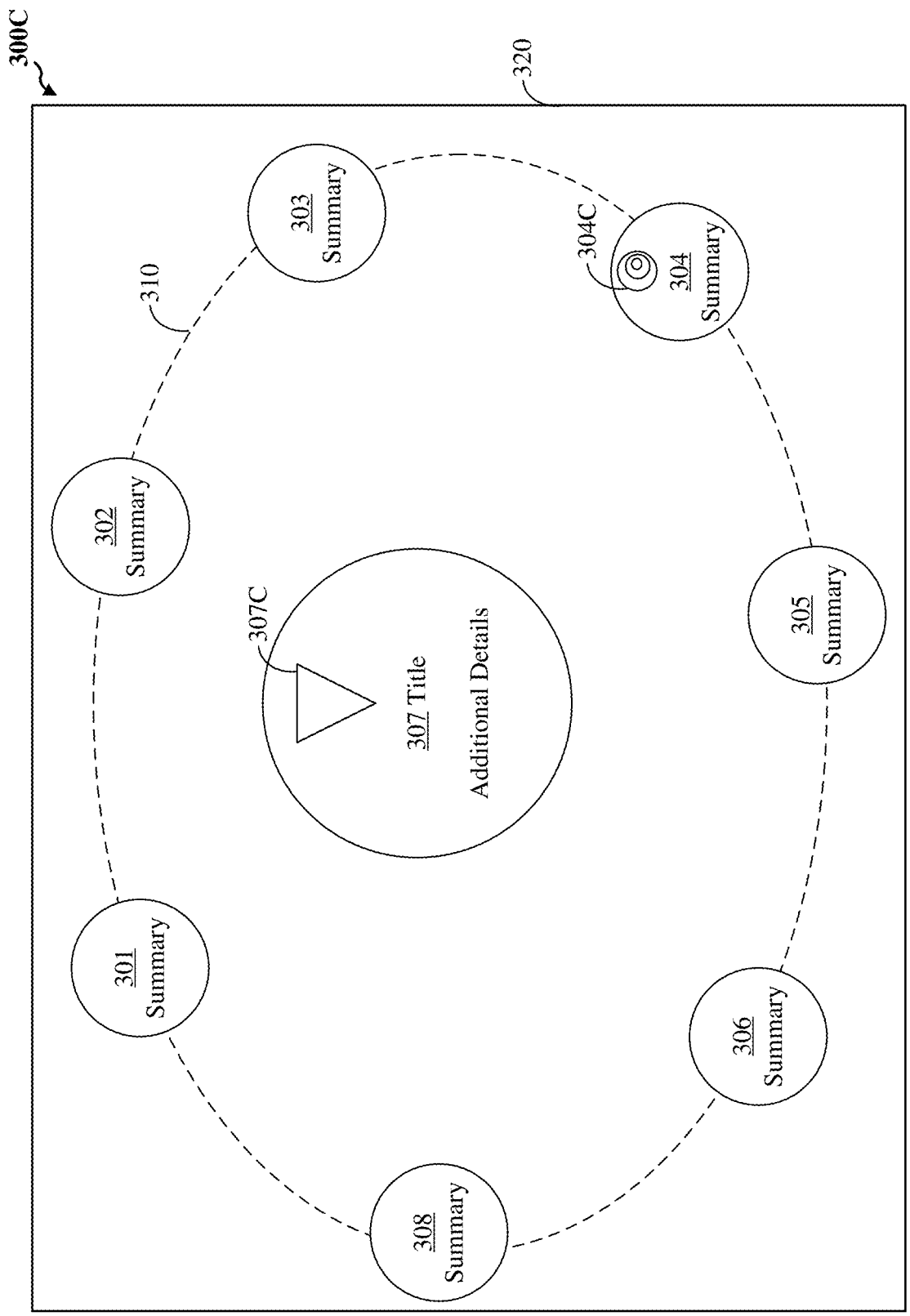
FIG. 3C shows an example content visualization, in accordance with some implementations.

FIG. 3C shows an example content visualization 300C, in accordance with some implementations. More particularly, FIG. 3C shows the content visualization of FIG. 3A after content item 307 has completed its transition into its selected state in response to the user selection 350. Thus, the content item 307 is displayed at the focus position 320 within the ring 310 and displays the additional details and the enlarged graphic item 307C, while the content item 304 has returned to its position in the ring 310 in keeping with the predetermined order. Note that while in FIG. 3B the unselected content items are depicted mid-transition, and have not completed their motion, but that in FIG. 3C this motion has completed, and the unselected content items have moved to be evenly spaced around the ring 310, and in the predetermined order within the ring 310. While not shown for simplicity, at this point, another user selection may be received on a further unselected content item in the ring 310, for example content item 301. In response to such a further user selection, another transition similar to that depicted in FIGS. 3B and 3C may be triggered, resulting in content item 301 moving to the focus position 320 and transitioning to its selected state, while content item 307 moves back to its position in the ring 310 between content items 306 and 308 as it transitions to its unselected state.

Figure 4A:
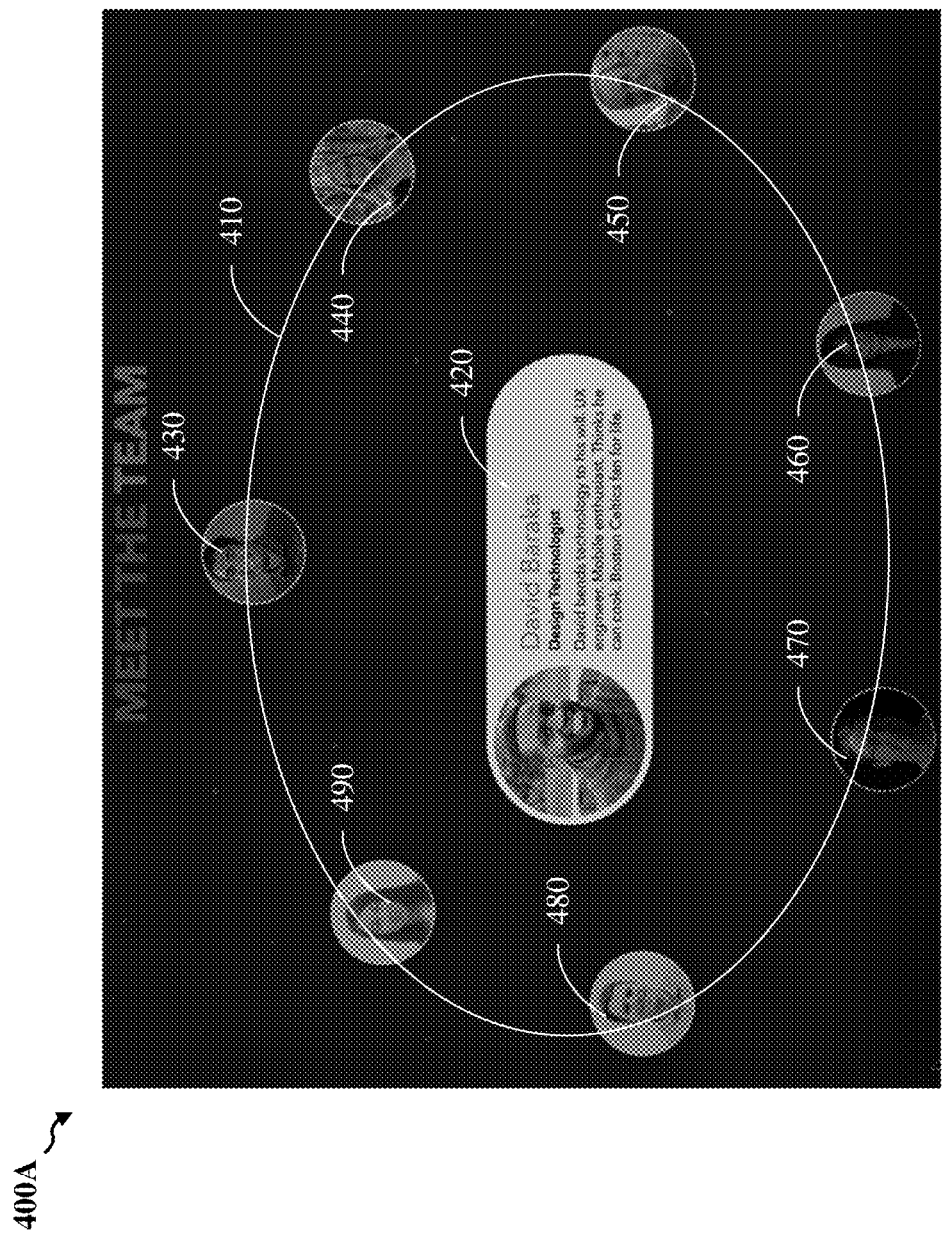
FIG. 4A shows a first view of a user interface depicting a content visualization, in accordance with some implementations.

FIGS. 4A-4E illustrate in more detail example transitions of content items on a user interface, in accordance with some implementations. FIG. 4A shows a first view 400A of a user interface depicting a content visualization, in accordance with some implementations. More particularly, FIG. 4A shows a plurality of content items within a ring 410. This plurality of content items may have a predetermined ordering, expressed in clockwise order, of content item 430, 440, 420, 450, 460, 470, 480, and 490. In the example of FIGS. 4A-4E the content visualization depicts information about individuals working within a team at a company, and may be used, for example, for introducing the members of this team to others within or outside the company, such as to coworkers or to potential customers. Each content item within the content visualization shown in FIG. 4A corresponds to a different person within the team and includes a photograph of the person associated with the content item. Similarly to FIGS. 3A-3C, each content item may be depicted in either a selected or an unselected state. For example, content items 430, 440, 450, 460, 470, 480 and 490 are shown in their unselected state, while content item 420 is shown in its selected state. In contrast to the example of FIGS. 3A-3C, in FIG. 4A, unselected content items do not include text information, or a summary, but instead depict only the photograph of the person corresponding to the content item. The selected content items, such as selected content item 420, includes the photograph in addition to the name of the person associated with the content item 420, a job title, and a brief description. In contrast to the example of FIGS. 3A-3C, where selected and unselected content items have the same shape, in FIG. 4A the unselected content items have a circular shape, while the selected content item 420 has a larger "stadium" or capsule shape, with semicircular left and right sides, and a flat top and bottom.

Each of the unselected content items shown in FIG. 4A may be selectable, similarly to the example of FIGS. 3A-3C. For example, a user selection may be received on the content item 430.

Figure 4B:
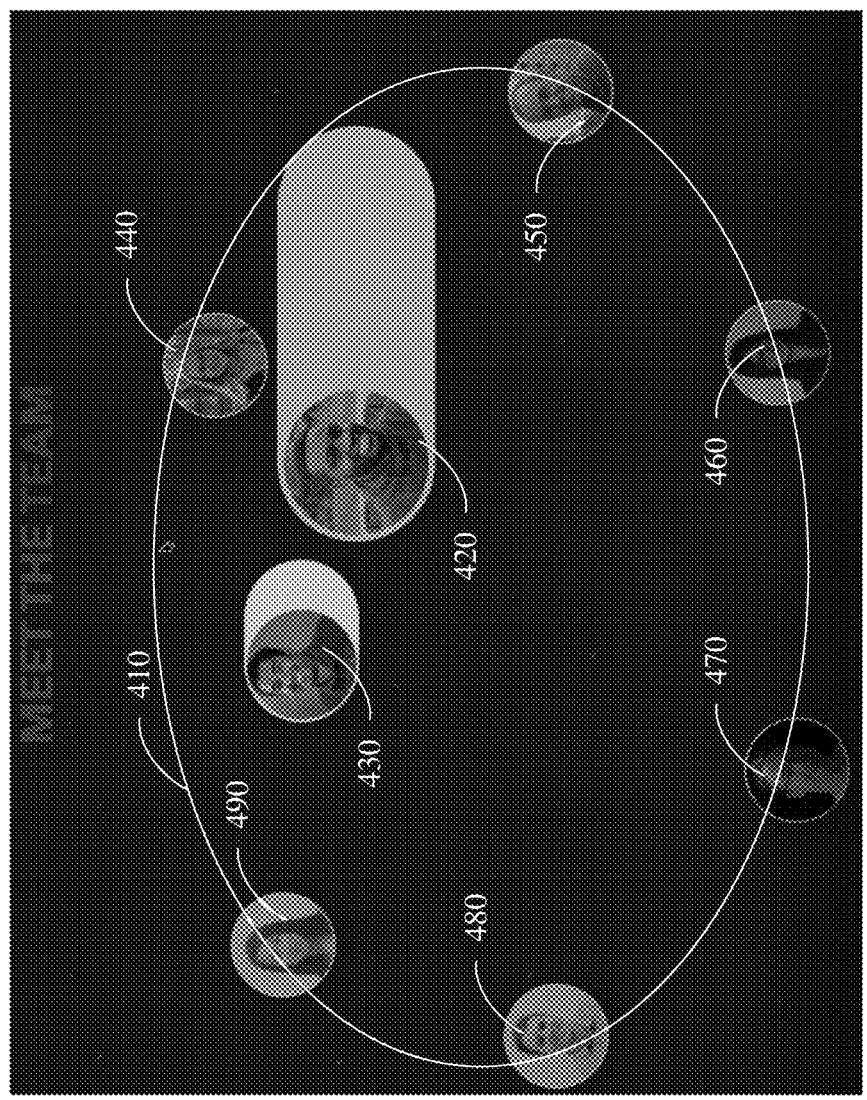
FIG. 4B shows a second view of a user interface depicting a content visualization during a first transition, in accordance with some implementations.

FIG. 4B shows a second view 400B of a user interface depicting a content visualization during a first transition, in accordance with some implementations. More particularly, FIG. 4B shows the content visualization after a user selection has been received on the content item 430 and during the transition of the content item 430 from the unselected state to the selected state. Thus, the content item 430 is shown to have left its initial position within the ring 410 and is in the process of moving to the focus position at the center of the ring 410. While the transitions depicted in FIGS. 3A-3C simply enlarged the content item during such a transition, in the example of FIGS. 4A-4E this transition includes the content item enlarging but also expanding to the right to transition from the circular shape to the stadium or capsule shape. Similarly, the previously selected content item 420 is shown in the process of transitioning to its unselected state and moving back to its position within the ring 410. Note that the name associated with content item 420, the job title, and the description shown in FIG. 4A are not present during the transition of content item 420 to its unselected state. Further, the predetermined order is maintained, and so content item 420 is in motion to its position between content items 440 and 450. The other unselected content items automatically move to maintain an even spacing around the ring 410, and so note for example how content item 440 has moved counterclockwise around the ring 410 to maintain spacing, and to make space for the content item 420 to enter the ring 410.

Figure 4C:
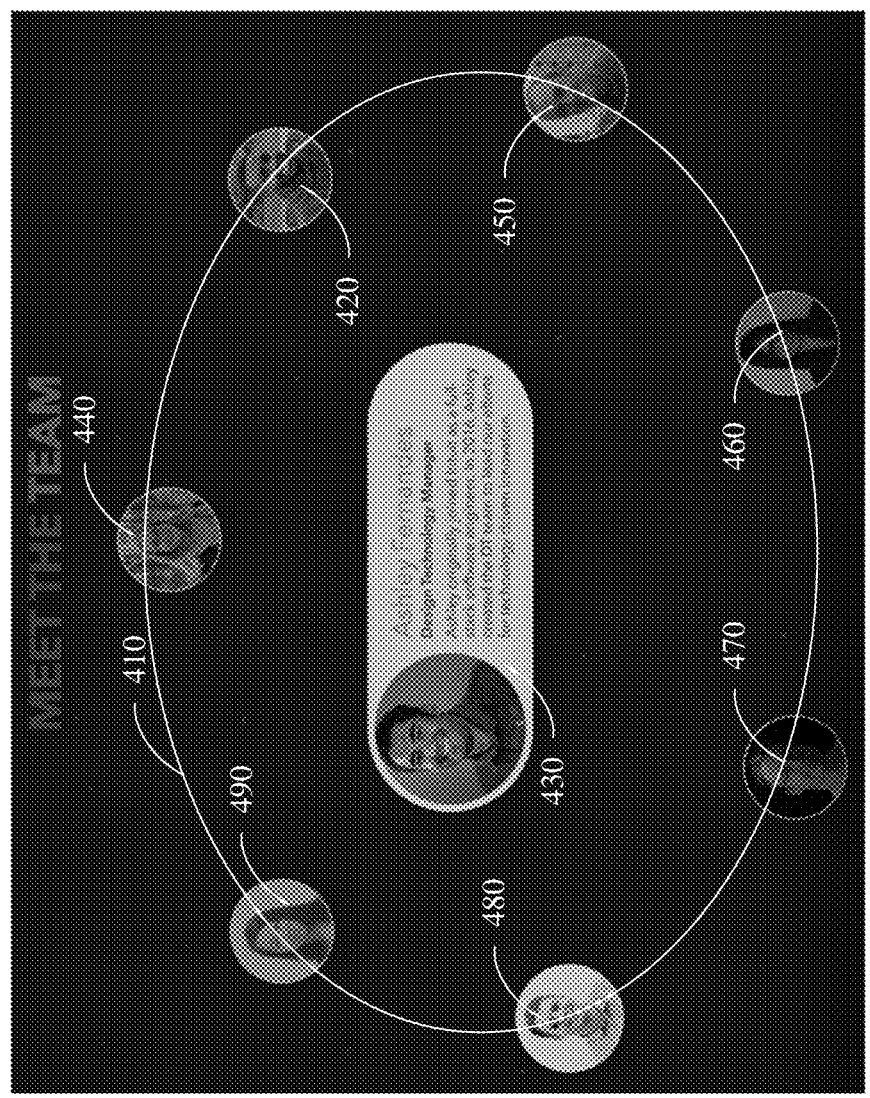
FIG. 4C shows a third view of a user interface depicting a content visualization upon completion of the first transition, in accordance with some implementations.

FIG. 4C shows a third view 400C of a user interface depicting a content visualization upon completion of the first transition, in accordance with some implementations. More particularly, FIG. 4C shows the content visualization after the content item 430 has completed its transition from within the ring 410 to the focus position of the ring 410 and its transition from its unselected state to its selected state. Note that content item 430 is shown in FIG. 4C to have the stadium or capsule shape, and to include the additional information about the user's name, title, and description which was not present in FIG. 4A or 4B. Similarly, the content item 420 has competed its transition back to its unselected state in its predetermined order within the ring 410. Further, note how the unselected content items automatically maintain even spacing around the ring 410, for example content item 440 has completed its motion in a counterclockwise direction to make space for content item 420 to reenter the ring 410. At this point, a user selection may be received at another unselected content item, such as content item 480.

Figure 4D:
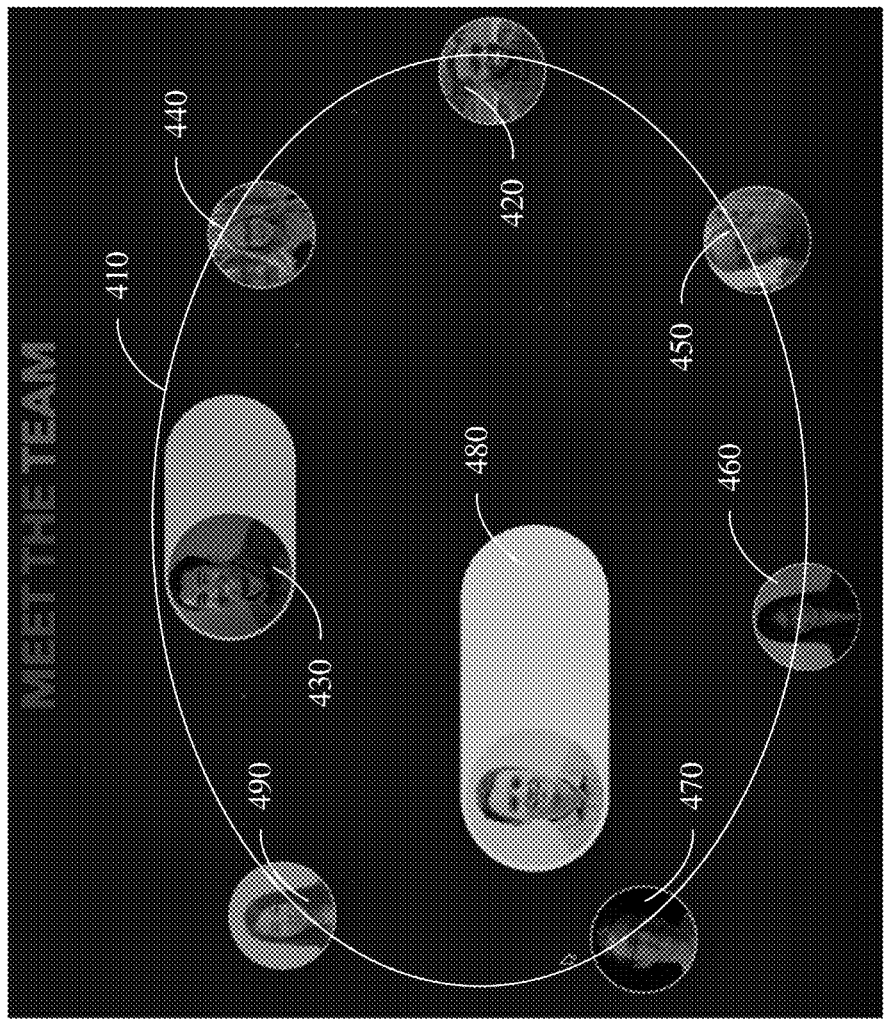
FIG. 4D shows a fourth view of a user interface depicting a content visualization during a second transition, in accordance with some implementations.

FIG. 4D shows a fourth view 400D of a user interface depicting a content visualization during a second transition, in accordance with some implementations. More particularly, FIG. 4D shows the content visualization after a user selection has been received on content item 480, and during content item 480s transition to the focus position of the ring 410. Thus content item 480 is shown transitioning to its selected state, expanding to the right into the stadium or capsule shape while increasing in size and moving towards the center of the ring 410. Similarly, the previously selected content item 430 is shown decreasing in size, changing shape back into the circle of its unselected state, and returning to its position in the ring 410 in the predetermined order. Remaining unselected content items automatically move around the ring to maintain even spacing and the predetermined order. For example, FIG. 4D shows the content items 440, 420, 450, 460, and 470 moving clockwise around the ring 410 to maintain even spacing and to make room for the content item 430 to reenter the ring 410 in its predetermined order and to fill the space left by the content item 480 leaving the ring 410.

Figure 4E:
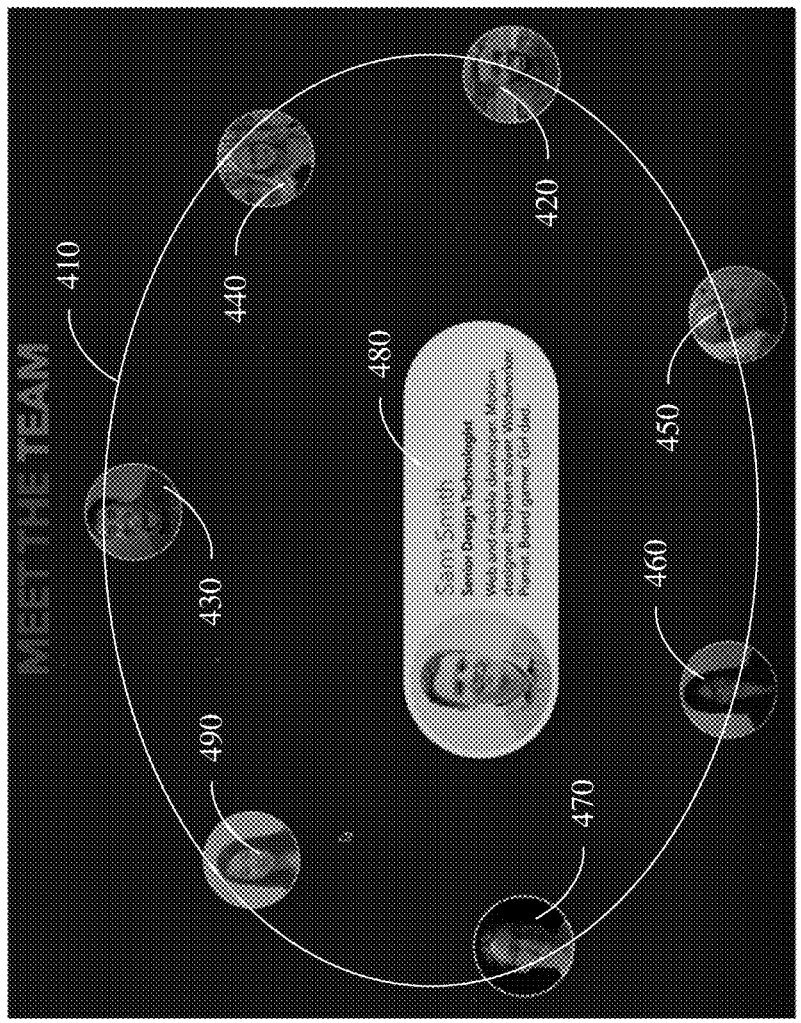
FIG. 4E shows a fifth view of a user interface depicting a content visualization upon completion of the second transition, in accordance with some implementations.

FIG. 4E shows a fifth view 400E of a user interface depicting a content visualization upon completion of the second transition, in accordance with some implementations. More particularly, FIG. 4E shows the content visualization after the content item 480 has completed its transition from within the ring 410 to the focus position of the ring 410 and its transition from its unselected state to its selected state. Content item 430 has completed its return to within the ring 410 and to its unselected state, while the content item 480 is in the focus position of the ring 410 and in its selected state. The content item 480 thus shows not only the photograph of the employee associated with the content item 480, but their name, job title, and description.

In some aspects, the ring 410 shown in FIGS. 4A-4E may have a shape determined according to parametric equations given by $x=r_1 \cos(\theta)$ and $y=r_2 \sin(\theta)$, where $r_1$ and $r_2$ determine the width and height of the ring 410, respectively, $\theta$ varies from 0° to 360°, and $(x,y)=(0,0)$ is the center of the ring 410. Varying $r_1$ and $r_2$ may be used to give the ring 410 an elliptical shape as shown in FIGS. 4A-4E, such as by setting $r_1$ to be greater than $r_2$. Similarly, as discussed above, the height and width of the ring 410 may be based on the available width and height of the user interface upon which the ring 410 is to be depicted. For example, $r_1$ and $r_2$ may be scaled based on the available width and height. In some aspects, scaling $r_1$ and $r_2$ may maintain a ratio between $r_1$ and $r_2$, such that $(r_1/r_2)$ is a predetermined ratio, regardless of the available width and height of the user interface.

Evenly spacing the content items 420-490 may be performed by assigning each content item to be placed at an angular location on the ring 410 at an angular separation of (360/N) degrees, where N is the number of content items. In other words, when no content item of the content items 420-490 are in the focus position, N is 8 and each content item is spaced around the ring 45 degrees from its nearest neighbor. Thus, assigning the positions of the content items 420-490 may include determining an x and a y coordinate for each content item according to the predetermined order using the parametric equations above, beginning from a specified initial location, such as $\theta=0°$ or another suitable initial angle, for the first content item in the predetermined ordering, and spacing each subsequent content item in the predetermined order at the appropriate angular separation. When a content item is selected, N is reduced by one and the x and y coordinates for the remaining content items may be recalculated using the parametric equations and the updated angular separation of (360/(N−1)) degrees and in accordance with the predetermined ordering of the unselected content items. The selected content item is of course moved to the focus position, which may be $(x,y)=(0,0)$. In response to subsequent selections of content items (i.e., after a content item is already in the focus position of the ring 410), may cause the locations of the remaining content items and the formerly selected content item to be determined similarly, placing the previously selected content item back into the predetermined ordering, assigning the newly selected content item to the location of the focus position (e.g., (0,0)) and determining the coordinates of the remaining content items using the parametric equations and the angular separation of (360/(N−1)) degrees. Thus, for N=8 this new angular separation is 360/7 degrees or just over 51 degrees. Note that in some aspects, animating the transitions of a content item between a first set of coordinates and a second set of coordinates may be performed using Cascading Style Sheets (CSS) transitions, or another suitable software package.

Figure 5:
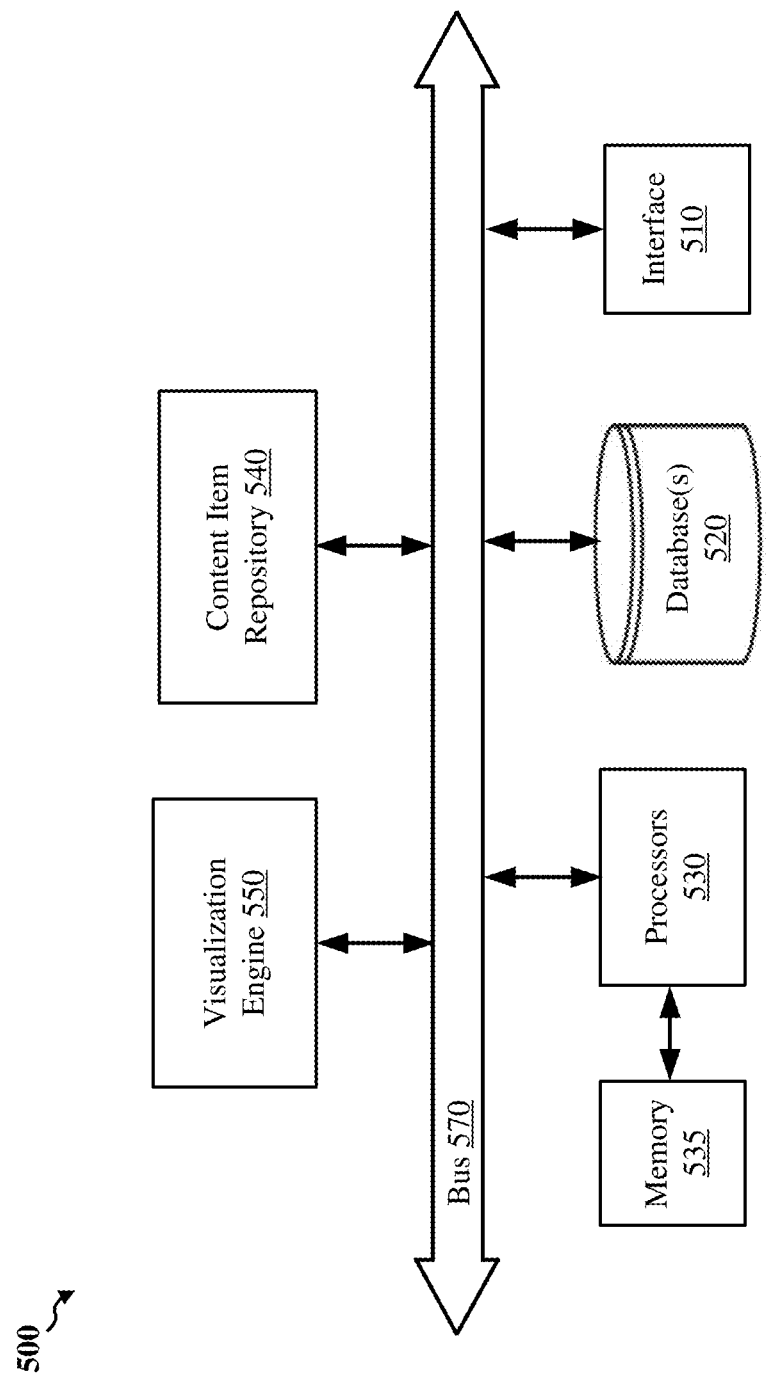
FIG. 5 shows a content visualization system, according to some implementations.

FIG. 5 shows a content visualization system 500, according to some implementations. Various aspects of the content visualization system 500 disclosed herein may be applicable for dynamic presentation of content items in a user interface in a variety of computing applications. Such functionality may be useful for providing users with well-structured content visualization which automatically scales to the width of the user interface, and where content items automatically move to maintain an even spacing for ease of user interaction.

The content visualization system 500 is shown to include an input/output (I/O) interface 510, a database 520, one or more data processors 530, a memory 535 coupled to the data processors 530, a content item repository 540, and a visualization engine 550. In some implementations, the various components of the content visualization system 500 may be interconnected by at least a data bus 570, as depicted in the example of FIG. 5. In other implementations, the various components of the content visualization system 500 may be interconnected using other suitable signal routing resources.

The interface 510 may include a screen, an input device, and other suitable elements that allow a user to provide information to the content visualization system 500 and/or to retrieve information from the content visualization system 500. Example information that can be provided to the content visualization system 500 may include information for configuring the visualization engine 550, such as information for how to structure the geometric arrangement of a visualization, how content items should be depicted in each of their unselected and selected states, how a content visualization should depend on a width or other size of a user interface, and so on, in addition to information associated with content items stored in the content item repository 540, such as textual or graphical information to be presented in a content item in either or both of its unselected or selected states, and so on. Example information that can be retrieved from the content visualization system 500 may include data retrieved from the content item repository 540, for example via one or more networks coupled to the content visualization system 500, content visualizations generated by the content visualization system 500, for example for display on one or more remote devices or displays, and the like.

The database 520, which may represent any suitable number of databases, may store any suitable information pertaining to configuration of the content visualization system 500, or to users of the content visualization system 500. For example, the information may include configuration information for managing enablement or customization associated with content items or content visualizations, and so on. In some implementations, the database 520 may be a relational database capable of presenting the information as data sets to a user in tabular form and capable of manipulating the data sets using relational operators. In some aspects, the database 520 may use Structured Query Language (SQL) for querying and maintaining the database 520.

The data processors 530, which may be used for general data processing operations (such as manipulating the data sets stored in the data repository 540), may be one or more suitable processors capable of executing scripts or instructions of one or more software programs stored in the content visualization system 500 (such as within the memory 535). The data processors 530 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 530 may be implemented as a combination of computing devices (such as a combination of a DSP and a microprocessor, a plurality of microprocessors, one or more microprocessors in conjunction with a DSP core, or any other such configuration).

The memory 535, which may be any suitable persistent memory (such as non-volatile memory or non-transitory memory) may store any number of software programs, executable instructions, machine code, algorithms, and the like that can be executed by the data processors 530 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The content item repository 540 may store data associated with content items to be displayed in content visualizations to be generated by the content visualization system 500. For example, the content item repository 540 may store images or video content to be displayed in a content item, such as the photographs shown in the content items of FIGS. 4A-4E, in addition to text content, such as the names, job titles, and descriptions shown in the content items of FIGS. 4A-4E.

The visualization engine 550 may generate visualizations based on data from the content item repository 540. For example, a visualization may be generated based on data associated with each of a plurality of content items from the data repository 540, according to one or more configurations stored in the visualization engine 550, the database 520, or in another memory coupled to the content visualization system 500. For example, the configurations may specify a geometric arrangement such as a shape for the content items to be arranged in, a focus position associated with the geometric arrangement, scaling information for scaling the content visualization based on a width of a user interface, ordering information specifying a predetermined order for the content items of the content visualization, shapes, colors, and other configuration information for presenting content items in each of their unselected and selected states, animation information for animating a transition of a content item back and forth between its unselected and selected states, and so on.

The particular architecture of the content visualization system 500 shown in FIG. 5 is but one example of a variety of different architectures within which aspects of the present disclosure may be implemented. For example, in other implementations, the content visualization system 500 may not include the content item repository 540, the functions of which may be implemented by the processors 530 executing corresponding instructions or scripts stored in the memory

535. In further implementations, all, or part of the content item repository 540 may not be located within the content visualization system 500 but may instead be coupled to the content visualization system 500 via one or more network resources. In some other implementations, the functions of the visualization engine 550 may be performed by the processors 530 executing corresponding instructions or scripts stored in the memory 535.

Figure 6:
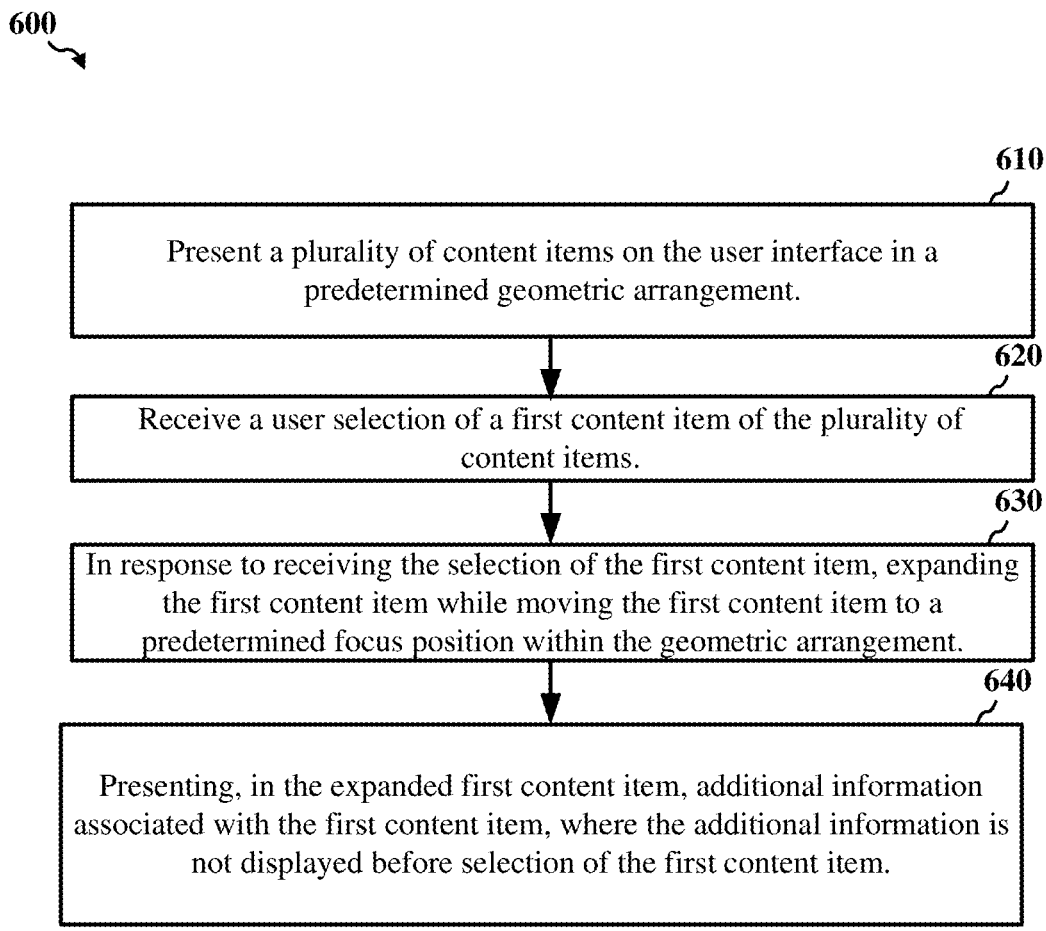
FIG. 6 shows an illustrative flow chart depicting an example operation for dynamic presentation of content items in a user interface, according to some implementations.

FIG. 6 shows an illustrative flow chart depicting an example operation 600 for dynamic presentation of content items in a user interface, according to some implementations. The example operation 600 may be performed by one or more processors of a computing device such as the content visualization system 500 of FIG. 5. It is to be understood that the example operation 600 may be performed by any suitable systems, computers, or servers.

At block 610, the content visualization system 500 presents a plurality of content items on the user interface in a predetermined geometric arrangement. At block 620, the content visualization system 500 receives a user selection of a first content item of the plurality of content items. In response to receiving the user selection of the first content item, at block 630 the content visualization system 500 expands the first content item while moving the first content item to a predetermined focus position within the geometric arrangement. At block 640, the content visualization system 500 presents, in the expanded first content item, additional information associated with the first content item, where the additional information is not displayed before receiving the user selection of the first content item.

In some aspects, presenting the plurality of content items in block 610 includes presenting the plurality of content items in a predetermined order in the predetermined geometric arrangement.

In some aspects, the operation 600 further includes determining an available width of the user interface, where presenting the plurality of content items is based at least in part on the available width of the user interface. In some aspects, the geometric arrangement has a width determined based at least in part on the available width of the user interface.

In some aspects, presenting the plurality of content items in block 610 further includes determining a dynamic position for each content item in the plurality of content items. In some aspects, the dynamic position for each content item is determined so that the plurality of content items are evenly spaced within the predetermined geometric arrangement. In some aspects, the dynamic position for each content item in the plurality of content items is determined based at least in part on a number of content items in the plurality of content items.

In some aspects, the predetermined geometric arrangement is a ring. In some aspects, the predetermined geometric arrangement is a closed polygon. In some aspects, the predetermined focus position is a center position of the predetermined geometric arrangement.

In some aspects, presenting the plurality of content items includes presenting, within each content item of the plurality of content items, summary information associated with the respective content item.

In some aspects, the operation 600 further includes prior to receiving the user selection of the first content item, presenting an initial content item at the predetermined focus position, wherein presenting the initial content item includes presenting additional information associated with the initial content item, and in response to receiving the user selection of the first content item, reducing a size of the initial content item while moving the initial content item into the predetermined geometric arrangement at a predetermined relative location within the plurality of content items. In some aspects, reducing the display size of the initial content item includes ceasing to display the additional content associated with the initial content item. In some aspects, moving the initial content item into the predetermined geometric arrangement includes dynamically adjusting a position of one or more remaining content items of the plurality of content items to maintain even spacing of the plurality of content items within the predetermined geometric arrangement.

Figure 7:
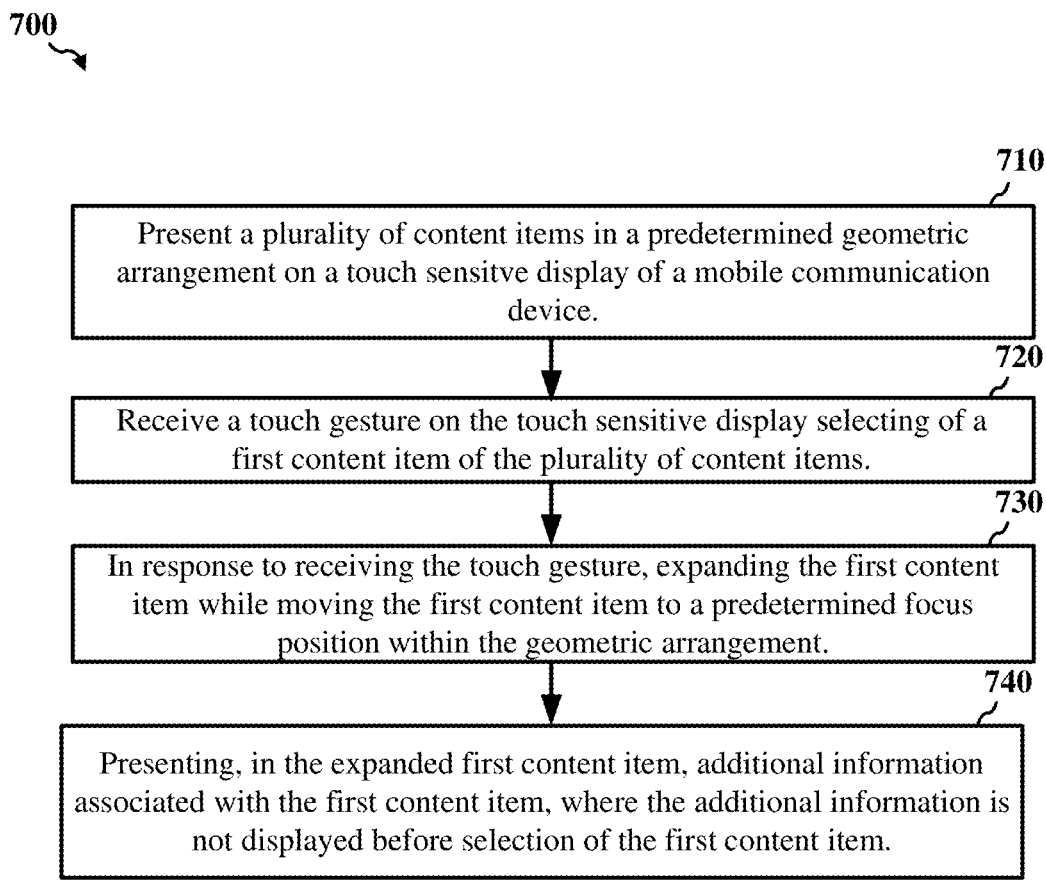
FIG. 7 shows an illustrative flow chart depicting an example operation for dynamic presentation of content items in a user interface, according to some implementations.

FIG. 7 shows an illustrative flow chart depicting an example operation 700 for dynamic presentation of content items in a user interface, according to some implementations. The example operation 700 may be performed by one or more processors of a computing device such as the content visualization system 500 of FIG. 5. It is to be understood that the example operation 700 may be performed by any suitable systems, computers, or servers.

At block 710, the content visualization system 500 presents a plurality of content items in a predetermined geometric arrangement on a touch-sensitive display coupled to the content visualization system 100. At block 720, the content visualization system 500 receives a touch gesture on the touch-sensitive display selecting a first content item of the plurality of content items. In response to receiving the touch gesture, at block 730 the content visualization system 500 expands the first content item while moving the first content item to a predetermined focus position within the geometric arrangement. At block 740, the content visualization system 500 presents, in the expanded first content item, additional information associated with the first content item, where the additional information is not displayed before receiving the user selection of the first content item.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for dynamically presentation of content items in a user interface, the method performed by one or more processors of a computing device and comprising:
    presenting a plurality of content items on the user interface in a predetermined geometric arrangement;
    presenting an initial content item at the predetermined focus position, wherein presenting the initial content item comprises presenting additional information associated with the initial content item;
    receiving a user selection of a first content item of the plurality of content items;
    in response to receiving the user selection of the first content item, expanding the first content item while moving the first content item to the predetermined focus position within the geometric arrangement and reducing a size of the initial content item while moving the initial content item into the predetermined geometric arrangement at a predetermined relative location within the plurality of content items, wherein remaining content items of the plurality of content items retain their size and relative position within the predetermined geometric arrangement, the remaining content items not including the initial content item or the first content item; and
    presenting, in the expanded first content item, additional information associated with the first content item, the additional information not displayed before receiving the user selection of the first content item.

2. The method of claim 1, wherein presenting the plurality of content items comprises presenting the plurality of content items in a predetermined order in the predetermined geometric arrangement.

3. The method of claim 1, further comprising determining an available width of the user interface, wherein presenting the plurality of content items is based on the available width of the user interface.

4. The method of claim 3, wherein the geometric arrangement has a width determined based on the available width of the user interface.

5. The method of claim 1, wherein presenting the plurality of content items further comprises determining a dynamic position for each content item in the plurality of content items.

6. The method of claim 5, wherein the dynamic position for each content item in the plurality of content items is determined so that the plurality of content items are evenly spaced within the predetermined geometric arrangement.

7. The method of claim 5, wherein the dynamic position for each content item in the plurality of content items is determined based at least in part on a number of content items in the plurality of content items.

8. The method of claim 1, wherein the predetermined geometric arrangement is a ring.

9. The method of claim 1, wherein the predetermined geometric arrangement is a closed polygon.

10. The method of claim 1, wherein the predetermined focus position is a center position of the predetermined geometric arrangement.

11. The method of claim 1, wherein presenting the plurality of content items comprises presenting, within each content item of the plurality of content items, summary information associated with the respective content item.

12. The method of claim 1, wherein reducing the display size of the initial content item comprises ceasing to display the additional information associated with the initial content item.

13. The method of claim 1, wherein moving the initial content item into the predetermined geometric arrangement comprises dynamically adjusting a position of one or more remaining content items of the plurality of content items to maintain even spacing of the plurality of content items within the predetermined geometric arrangement.

14. A system for dynamically presenting content items in a user interface, comprising:
    one or more processors; and
    a memory storing instructions that, when executed by the one or more processors, cause the system to perform operations comprising:
    presenting, on the user interface, a plurality of content items in a predetermined geometric arrangement;
    presenting an initial content item at the predetermined focus position, wherein presenting the initial content item comprises presenting additional information associated with the initial content item;

receiving a user selection of a first content item of the plurality of content items;

in response to receiving the user selection of the first content item, expanding the first content item while moving the first content item to the predetermined focus position within the geometric arrangement and reducing a size of the initial content item while moving the initial content item into the predetermined geometric arrangement at a predetermined relative location within the plurality of content items, wherein remaining content items of the plurality of content items retain their size and relative position within the predetermined geometric arrangement, the remaining content items not including the initial content item or the first content item; and presenting, in the expanded first content item, additional information associated with the first content item, the additional information not displayed before receiving the user selection of the first content item.

15. The system of claim 14, wherein execution of the instructions for presenting the plurality of content items causes the system to perform operations further comprising presenting the plurality of content items in a predetermined order in the predetermined geometric arrangement.

16. The system of claim 14, wherein execution of the instructions for reducing the display size of the initial content item causes the system to perform operations further comprising ceasing to display the additional information associated with the initial content item.

17. The system of claim 14, wherein moving the initial content item into the predetermined geometric arrangement comprises dynamically adjusting a position of one or more remaining content items of the plurality of content items to maintain even spacing of the plurality of content items within the predetermined geometric arrangement.

18. A mobile communication device for dynamically presenting content items in a user interface, comprising:

a touch-sensitive display;

one or more processors; and a memory storing instructions that, when executed by the one or more processors, cause the mobile communication device to perform operations comprising:

presenting a plurality of content items in a predetermined geometric arrangement on the touch-sensitive display;

presenting an initial content item at the predetermined focus position, wherein presenting the initial content item comprises presenting additional information associated with the initial content item;

receiving a touch gesture on the touch-sensitive display selecting a first content item of the plurality of content items;

in response to receiving the touch gesture, expanding the first content item while moving the first content item to a predetermined focus position within the geometric arrangement and reducing a size of the initial content item while moving the initial content item into the predetermined geometric arrangement at a predetermined relative location within the plurality of content items, wherein remaining content items of the plurality of content items retain their size and relative position within the predetermined geometric arrangement, the remaining content items not including the initial content item or the first content item; and presenting, in the expanded first content item, additional information associated with the first content item, the additional information not displayed before receiving the touch gesture selecting the first content item.

\* \* \* \* \*